(12) United States Patent
Krishnan et al.

(10) Patent No.: US 10,471,968 B2
(45) Date of Patent: Nov. 12, 2019

(54) METHODS AND APPARATUS TO FACILITATE SAFETY CHECKS FOR HIGH-PERFORMANCE VEHICLE FEATURES

(71) Applicant: Ford Global Technologies, LLC, Dearborn, MI (US)

(72) Inventors: Venkatesh Krishnan, Canton, MI (US); Scott Cutler, Canton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 15/870,329

(22) Filed: Jan. 12, 2018

(65) Prior Publication Data

US 2019/0217871 A1     Jul. 18, 2019

(51) Int. Cl.
| | |
|---|---|
| *B60W 50/08* | (2012.01) |
| *B60W 40/06* | (2012.01) |
| *B60W 40/02* | (2006.01) |
| *B60W 50/14* | (2012.01) |
| *H04W 4/80* | (2018.01) |
| *H04W 68/00* | (2009.01) |

(Continued)

(52) U.S. Cl.
CPC .......... *B60W 50/082* (2013.01); *B60W 40/02* (2013.01); *B60W 40/06* (2013.01); *B60W 50/14* (2013.01); *B60W 2050/0067* (2013.01); *B60W 2530/20* (2013.01); *B60W 2550/12* (2013.01); *B60W 2550/141* (2013.01); *B60W 2550/147* (2013.01); *B60W 2550/406* (2013.01); *G01S 19/13* (2013.01); *H04W 4/80* (2018.02); *H04W 68/005* (2013.01)

(58) Field of Classification Search
CPC .... B60W 50/082; B60W 50/14; B60W 40/02; B60W 40/06; B60W 2550/147; B60W 2530/20; B60W 2050/0067; B60W 2550/406; B60W 2550/141; B60W 2550/12; H04W 4/80; H04W 68/005; G01S 19/13

See application file for complete search history.

(56) References Cited

U.S. PATENT DOCUMENTS

| | | |
|---|---|---|
| 8,297,717 B2 | 10/2012 | Mlynarczyk et al. |
| 8,963,698 B2 | 2/2015 | Grossman |

(Continued)

FOREIGN PATENT DOCUMENTS

EP          2878477 A1     6/2015

*Primary Examiner* — Tyler J Lee
(74) *Attorney, Agent, or Firm* — Frank Lollo; Eversheds Sutherland (US) LLP

(57) ABSTRACT

Methods and apparatus are disclosed to facilitate safety checks for high-performance vehicle features. An example vehicle comprises a global positioning system (GPS) receiver, sensors, a processor and a memory. The GPS receiver generates location information. The sensors generate road information. The processor and memory are in communication with the sensors and the GPS receiver. The processor is configured to: determine a road type using the location information; determine a road clearance status using the road information; and generate a warning message including an override button based on one or more of the road type and the road clearance status.

20 Claims, 7 Drawing Sheets

(51) Int. Cl.
   *B60W 50/00* (2006.01)
   *G01S 19/13* (2010.01)

(56) References Cited

U.S. PATENT DOCUMENTS

| | | | |
|---|---|---|---|
| 9,043,095 B2 | 5/2015 | Froling | |
| 9,487,139 B1 * | 11/2016 | Ishida | B60W 50/14 |
| 9,493,118 B1 * | 11/2016 | Laur | B60Q 9/008 |
| 9,564,051 B2 | 2/2017 | Hainzlmaier et al. | |
| 10,065,638 B1 * | 9/2018 | Wood | B60W 50/082 |
| 2005/0259033 A1 * | 11/2005 | Levine | B60K 26/00 |
| | | | 345/7 |
| 2007/0136083 A1 * | 6/2007 | Simon | B60R 25/04 |
| | | | 701/36 |
| 2012/0158243 A1 * | 6/2012 | Pupin | B62D 15/0295 |
| | | | 701/36 |
| 2014/0005884 A1 | 1/2014 | Hampiholi | |
| 2014/0303839 A1 | 10/2014 | Filev et al. | |

* cited by examiner

METHODS AND APPARATUS TO FACILITATE SAFETY CHECKS FOR HIGH-PERFORMANCE VEHICLE FEATURES

TECHNICAL FIELD

The present disclosure generally relates to advanced vehicle features and, more specifically, methods and apparatus to facilitate safety checks for high-performance vehicle features.

BACKGROUND

In recent years, vehicles have been equipped with high-performance vehicle features such as front brake line lock, drift mode, etc. High-performance vehicle features often make sports vehicles more enjoyable to drive and/or improve racetrack performance of the sports vehicle. High-performance vehicle features are often engaged by a driver via an interface of a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises a global positioning system (GPS) receiver, sensors, a processor and a memory. The GPS receiver generates location information. The sensors generate road information. The processor and memory are in communication with the sensors and the GPS receiver. The processor is configured to: determine a road type using the location information; determine a road clearance status using the road information; and generate a warning message including an override button based on one or more of the road type and the road clearance status.

An example method is disclosed. The method comprises: determining, with a processor, a road type using location information provided by a global positioning system (GPS) receiver; determining, with the processor a road clearance status using road information generated by sensors; and generating, with the processor, a warning message based on at least one of the road type or the road clearance status, the warning message including an override button.

An example system is disclosed. The system comprises a central facility, a dedicated short range communication (DSRC) transceiver, sensors, a global positioning system (GPS) receiver, and a processor. The central facility has a database of weather information. The DSRC transceiver is disposed in a vehicle and in communication with the database. The sensors are disposed in the vehicle and generate road information. The GPS receiver is disposed in the vehicle and generates location information of the vehicle. The processor is in communication with the DSRC transceiver, the sensors, and the GPS receiver. The processor is configured to: determine a road type based on the location information; determine a road clearance status based on the road information; determine a weather status based on the weather information; and pause execution of a selected vehicle feature based on one or more of the road type, the location information, and the weather information.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
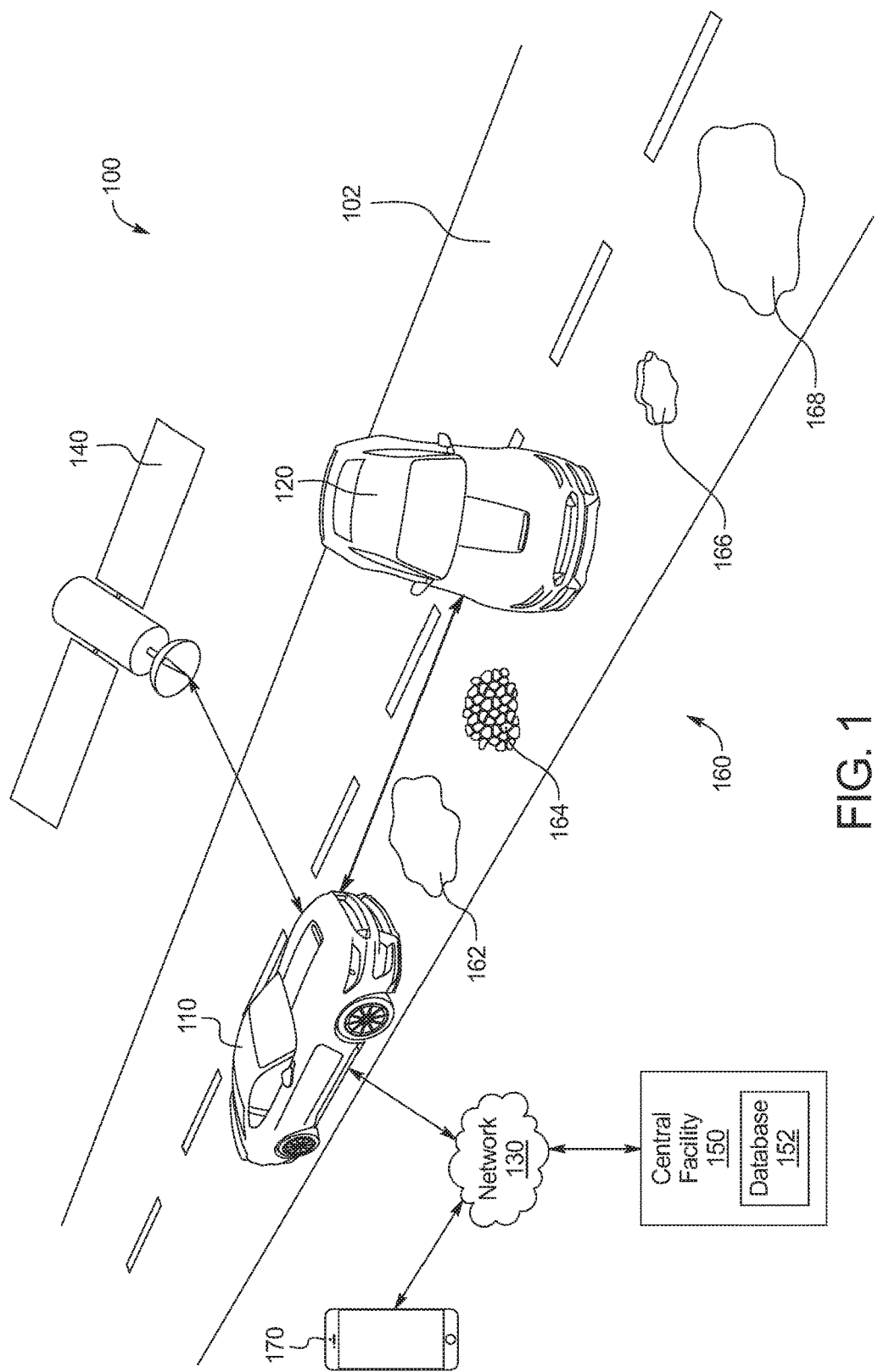
FIG. 1 illustrates a vehicle operating in accordance with the teachings of this disclosure in an environment.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

High-performance vehicle features include line lock and drift mode, among others. The line lock feature engages a vehicle's front brakes while the rear wheels are free to rotate to deposit a layer of tire rubber onto a road surface prior to a race. The drift mode feature distributes more power to a vehicle's back wheels and softens the vehicle's dampers to facilitate rapidly driving through a tight turn, often referred to as "drifting." These high-performance vehicle features are anticipated for use on a racetrack.

Traditionally, high-performance vehicle features can be activated outside of racetracks. In some instances, the driver may accidentally engage the feature. In other cases, the driver may engage the feature despite being outside a racetrack. In either case, the vehicle engages the feature without providing a warning to the driver related to the vehicle's location or surroundings.

This disclosure provides methods and apparatus to provide warnings related to a vehicle's location and/or surroundings in response to a driver engaging a high-performance vehicle feature. By providing location and/or surroundings-related warnings, a driver may correct his or her accidental engagement of the high-performance vehicle feature or reconsider use of the feature.

FIG. 1 illustrates a vehicle 110 operating in accordance with the teachings of this disclosure in an environment 100.

Figure 2:
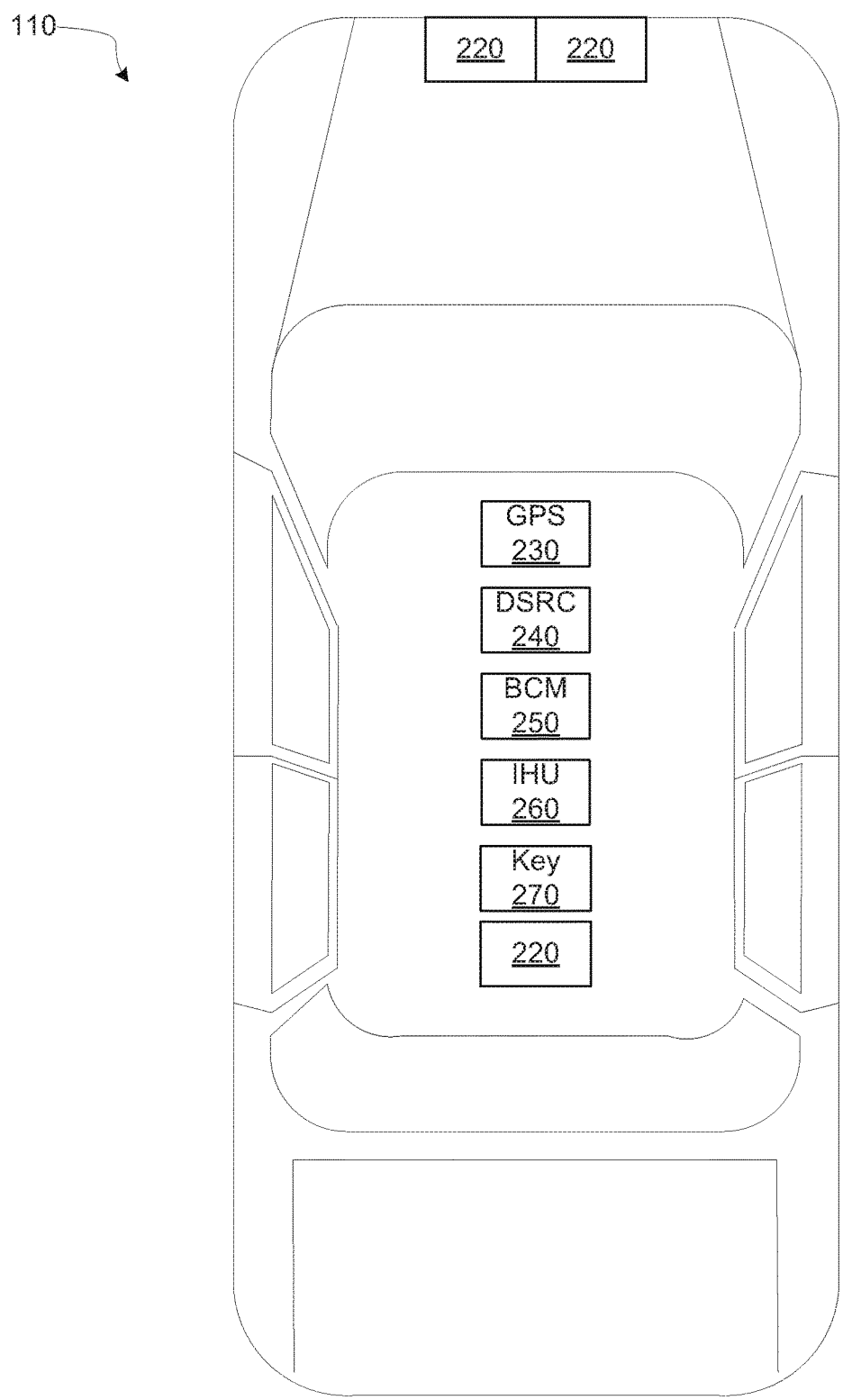
FIG. 2 is a schematic view of the vehicle of FIG. 1.
Figure 3:
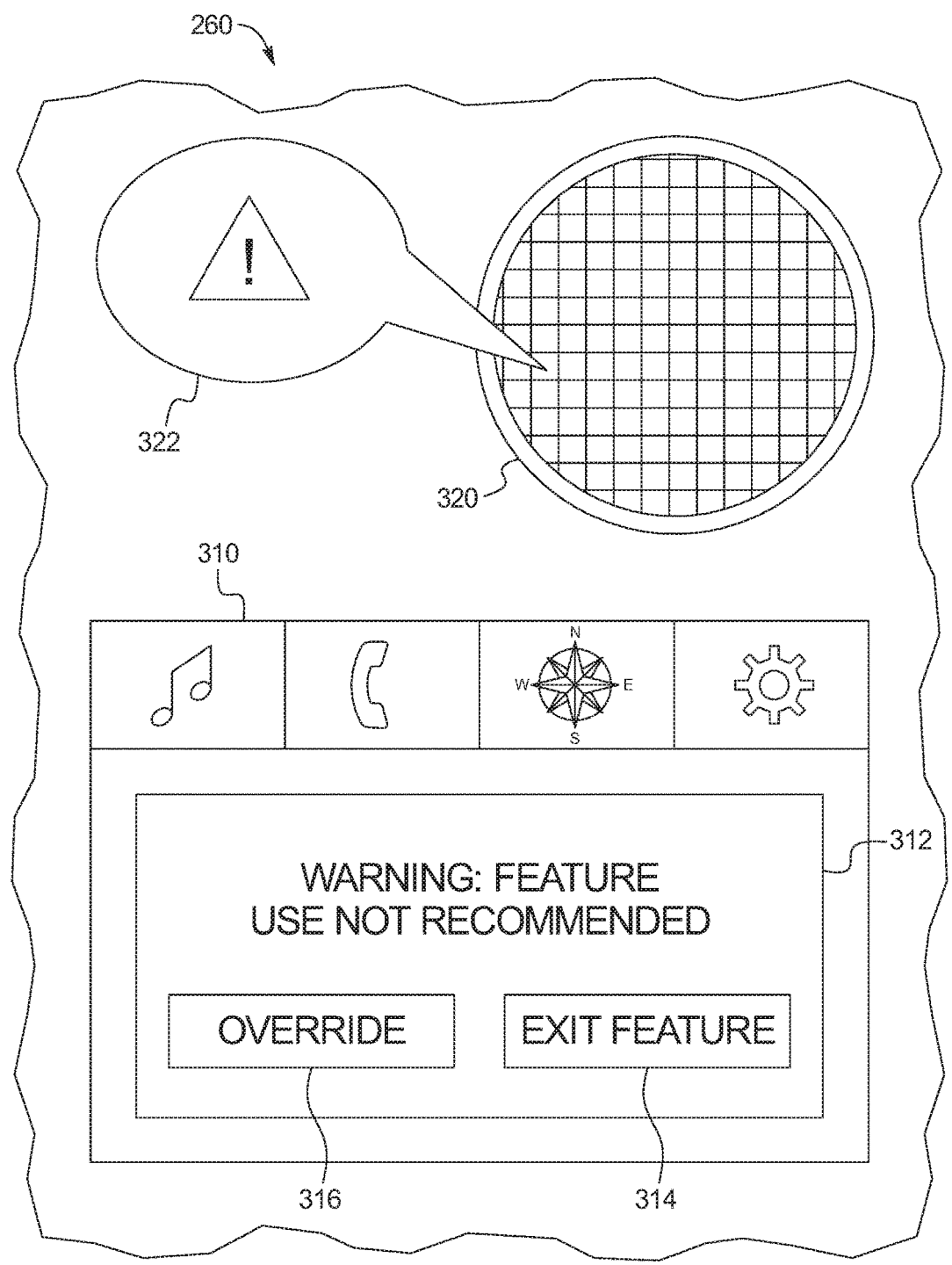
FIG. 3 is more detailed view of an infotainment head unit of the vehicle of FIG. 1.

FIG. 2 is a schematic view of the vehicle 110 of FIG. 1. FIG. 3 is more detailed view of an infotainment head unit 260 of the vehicle of FIG. 1.

As shown in FIG. 1, the vehicle 110 is a first vehicle 110. Additionally, as illustrated in FIG. 1, the environment 100 includes a roadway 102, the first vehicle 110, a second vehicle 120, a network 130, a global positioning system (GPS) satellite 140, a central facility 150, road hazards 160, and a mobile device 170 of a remote third party. The central facility 150 includes a database 152 that stores weather information. The road hazards 160 include an oil slick 162, particulate debris 164 (e.g., gravel, sand, rock salt, etc.), a pothole 166, and a puddle 168.

The vehicle 110 may be a standard gasoline powered vehicle, a hybrid vehicle, an electric vehicle, a fuel cell vehicle, and/or any other mobility implement type of vehicle. The vehicle 110 includes parts related to mobility, such as a powertrain with an engine, a transmission, a suspension, a driveshaft, and/or wheels, etc. The vehicle 110 may be non-autonomous, semi-autonomous (e.g., some routine motive functions controlled by the vehicle 110), or autonomous (e.g., motive functions are controlled by the vehicle 110 without direct driver input). As shown in FIGS. 2 and 3 the first vehicle 110 includes sensors 220, a GPS receiver 230, a dedicated short range communication (DSRC) transceiver 240, a body control module (BCM) 250, and an infotainment head unit (IHU) 260. The vehicle 110 is associated with a key 270. The key 270 includes an authorization code to start the vehicle 110 and to selectively request vehicle features. In other words, availability of high-performance vehicle features to a driver is based on the key 270. The key 270 may be a transceiver-equipped key (e.g., MyKey) or a mobile device.

The first vehicle 110 is in communication with the GPS satellite 140 via the GPS receiver 230. The first vehicle 110 is in communication with the central facility 150 and the mobile device 170 via the DSRC transceiver 240 and the network 130. If the second vehicle 120 is equipped with a DSRC transceiver, the first vehicle 110 is in communication with the second vehicle 120 via the DSRC transceiver 240 directly and/or indirectly via the DSRC transceiver 240 and the network 130.

The sensors 220 may be arranged in and around the vehicle 110 in any suitable fashion. The sensors 220 may be mounted to measure properties around the exterior of the vehicle 110. Additionally, some sensors 220 may be mounted inside the cabin of the vehicle 110 or in the body of the vehicle 110 (such as, the engine compartment, the wheel wells, etc.) to measure properties in the interior of the vehicle 110. For example, such sensors 220 may include accelerometers, odometers, tachometers, pitch and yaw sensors, wheel speed sensors, microphones, tire pressure sensors, and biometric sensors, etc. In the illustrated example, the sensors 220 are a camera, lidar, radar, a microphone, and an inertial measurement unit (IMU). The sensors 220 sense the road hazards 160 and objects, such as the second vehicle 120, in front of the vehicle 110. In other words, the sensors 220 generate road clearance information and road condition information for the vehicle 110. Further, the sensors 220 generate tire information such as tire audio references and tire audio samples of the tires of the vehicle 110, as will be explained in greater detail below.

The example DSRC transceiver 240 includes antenna(s), radio(s) and software to broadcast messages and to establish connections between the vehicles 110 and 120, infrastructure-based modules (e.g., the central facility 150), and mobile device-based modules, (e.g., the mobile device 170).

In some examples, the first vehicle 110 transmits road surface condition information detected by the sensors 220 to the second vehicle 120. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as GPS, Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The body control module 250 controls various subsystems of the vehicle 110. For example, the body control module 250 may control power windows, power locks, an immobilizer system, and/or power mirrors, etc. The body control module 250 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. Using road clearance and condition information provided by the sensors 220, location information provided via the GPS receiver 230, and neighboring vehicle information provided via the DSRC transceiver 240, the BCM 250 determines whether to warn a driver of the vehicle 110 regarding use of high-performance features on the roadway 102, as will be explained in greater detail below.

The infotainment head unit 260 provides an interface between the vehicle 110 and a user. The infotainment head unit 260 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 260 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 260 displays the infotainment system on, for example, the center console display.

As shown in FIG. 3, the IHU 260 includes a display 310 and speaker 320. The display 310 displays visual messages 312 and the speaker 320 announces audio messages 322. The visual messages 312 and the audio messages 322 warn a driver of the vehicle 110 that use of a high-performance feature is not recommended in light of the location, clearance, and/or condition of the roadway 102. The audio messages 322 include recordings of spoken messages, chimes, etc. The visual messages 312 include an exit button 314 and an override button 316. To heed the warning of the visual and audio messages 312, 322, the driver presses the exit button 314 to exit (e.g., stop, cancel, end, escape, etc.) execution of a selected high-performance vehicle feature. To ignore the warning of the video and audio messages 312, 322, the driver presses to override button 316 to continue execution of the selected high-performance vehicle feature. In some examples, if the driver overrides a high-performance feature warning, a message is sent to the mobile device 170 via the DSRC transceiver 240 and the network 130. Thus, a remote third party (e.g., an owner of the vehicle 110, a parent, etc.) may be notified about how the vehicle 110 is being used by a driver (e.g., a race driver, a young driver, a family member, etc.).

Figure 4:
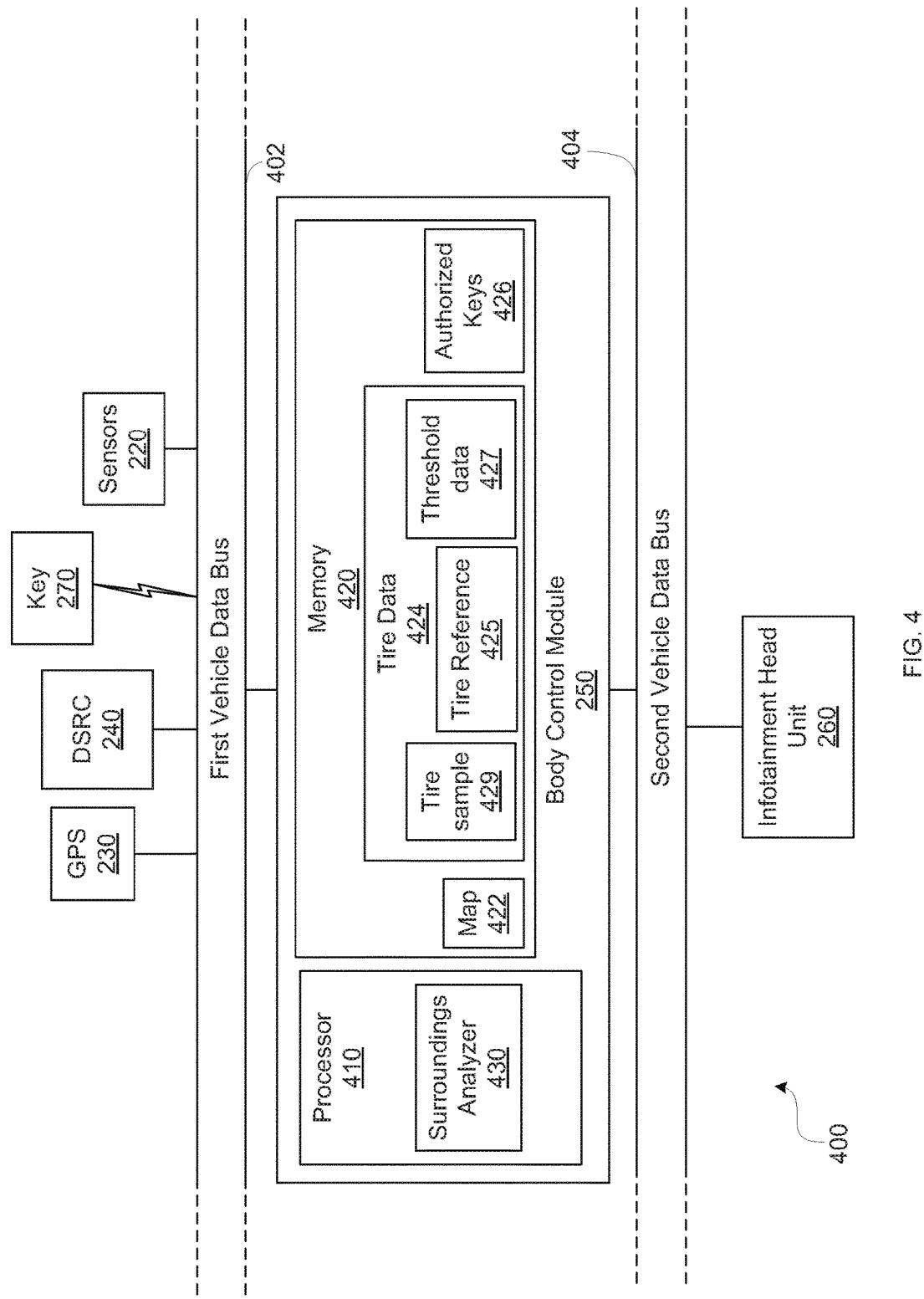
FIG. 4 is a block diagram of the electronic components of the vehicle of FIG. 1.

FIG. 4 is a block diagram of the electronic components 400 of the vehicle 110 of FIG. 1. The first vehicle data bus 402 communicatively couples the sensors 220, the GPS receiver 230, the DSRC transceiver 240, the BCM 250, the key 270, and other devices connected to the first vehicle data bus 402. In some examples, the first vehicle data bus 402 is implemented in accordance with the controller area network (CAN) bus protocol as defined by International Standards Organization (ISO) 11898-1. Alternatively, in some examples, the first vehicle data bus 402 may be a Media Oriented Systems Transport (MOST) bus, or a CAN flexible data (CAN-FD) bus (ISO 11898-7). The second vehicle data bus 404 communicatively couples the BCM 250 and the infotainment head unit 260. The second vehicle data bus 404 may be a MOST bus, a CAN-FD bus, or an Ethernet bus. In some examples, the BCM 250 communicatively isolates the first vehicle data bus 402 and the second vehicle data bus 404 (e.g., via firewalls, message brokers, etc.). Alternatively, in some examples, the first vehicle data bus 402 and the second vehicle data bus 404 are the same data bus.

The BCM 250 includes a processor or controller 410 and memory 420. In the illustrated example, the BCM 250 is structured to include a surroundings analyzer 430. Alternatively, in some examples, the surroundings analyzer 430 may be incorporated into another electronic control unit (ECU) with its own processor 410 and memory 420. In operation, the surroundings analyzer 430 determines whether to pause, stop, or release execution of a selected high-performance vehicle feature based on surroundings information from the sensors 220, the GPS receiver 230, and the DSRC transceiver 240; authorization information from the key 270; and driver selections from the IHU 260. The processor or controller 410 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 420 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 420 includes multiple kinds of memory, particularly volatile memory and non-volatile memory.

The memory 420 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 420, the computer readable medium, and/or within the processor 410 during execution of the instructions. The memory 420 stores a map 422, tire data 424, and a log of authorized keys 426. The map 422 includes location information of roadways (e.g., racetracks, public roads, known private roads, etc.). The tire data 424 includes a tire reference 425, threshold data 427, and a tire sample 429. The tire reference 425 and the tire sample 429 are generated by the sensors 220. The tire reference 425 is an electronic audio reference of the tires of the vehicle 110 when the tires are known to be in good condition. The tire sample 429 is an electronic audio reference of the tires of the vehicle 110 after execution of a high-performance vehicle feature. In some examples, a sound of the tires is recorded with a microphone to produce the tire reference 425 and the tire sample 429. In some examples, acceleration signals generated by an inertial measurement unit are converted into an audio sample to produce the tire reference 425 and/or the tire sample 429. The threshold data 427 includes a predetermined threshold difference between the tire reference 425 and the tire sample 429, which may be referred to as a tire threshold. The log of authorized keys 426 includes key authorization codes associated with respective authorization statuses (e.g., yes or no) to engage high-performance vehicle features.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Figure 5:
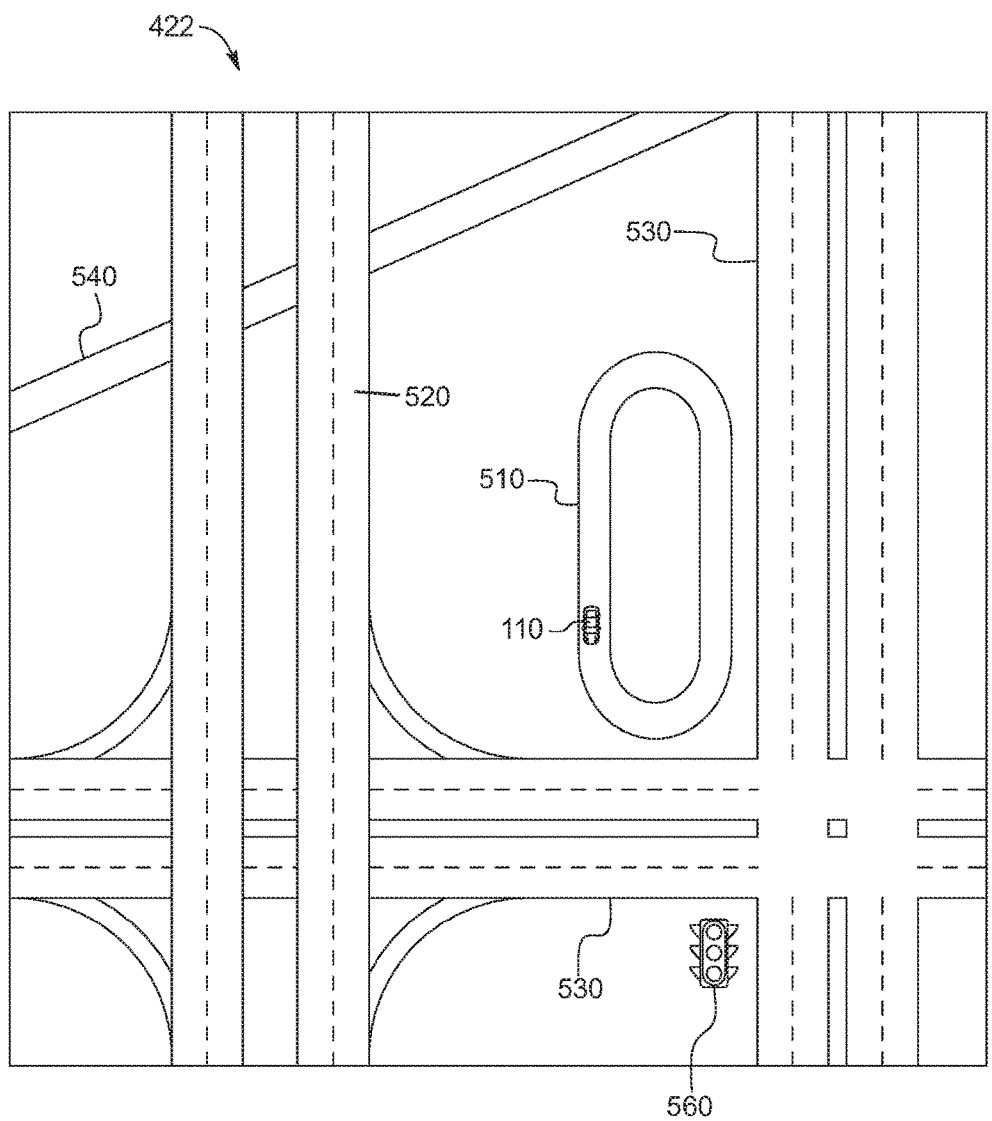
FIG. 5. is a map stored in a memory of the electronic components of FIG. 4.

FIG. 5. illustrates the map 422 stored in the memory 420 of the electronic components 400 of FIG. 4. The map 422 includes location information of differing road types, such as the racetrack 510, the divided freeway 520, the multi-lane arterial roads 530, and the street 540. The map 422 further includes a location information for a stoplight 560 where the arterial roads 530 intersect. It should be understood that map 422 is an example and that a map stored in the memory may have additional roads and traffic features (e.g., crosswalks, speed limits, speed bumps, etc.). In the illustrated example of FIG. 5, the vehicle 110 is located on the racetrack 510. The racetrack 510, the divided freeway 520, and the multi-lane arterial roads 530 are high-capacity roads. The street 540 is a low-capacity road. High-capacity roads may be suitable for high-performance vehicle features, depending on road clearance, road surface conditions, weather conditions, and tire condition. Low-capacity roads are not suitable for high-performance vehicle features.

Figure 6:
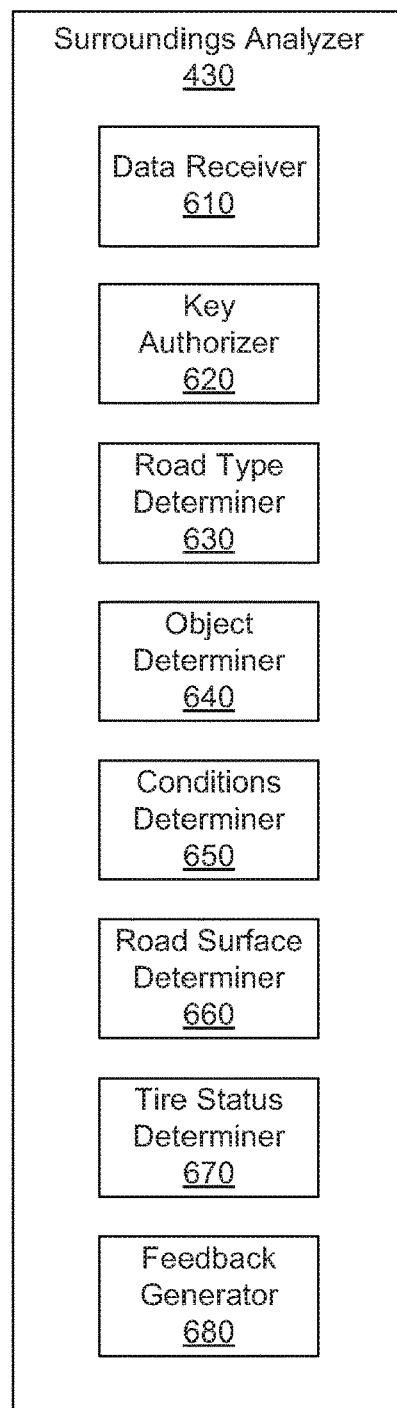
FIG. 6 is a more detailed block diagram of the surroundings analyzer of FIG. 7.

FIG. 6 is a more detailed block diagram of the surroundings analyzer 430 of FIG. 4. The surroundings analyzer 430 includes a data receiver 610, key authorizer 620, a road type determiner 630, an object determiner 640, a conditions determiner 650, a road surface determiner 660, a tire status determiner 670, and a feedback generator 680.

In operation, the data receiver 610 receives road condition information, road clearance information, and tire samples sent by the sensors 220, location information sent by the GPS receiver 230, oncoming vehicle information and weather information from the DSRC transceiver 240, and key authorization codes from the key 270. More specifically, the data receiver 610 updates the tire sample 429 stored in the memory 420 after execution of a high-performance vehicle function. The data receiver 610 further receives high-performance vehicle feature execution requests sent by the IHU 260. Additionally, the data receiver 610 receives override selections sent by the IHU 260.

In operation, the key authorizer 620 compares the key authorization codes to the log of authorized keys 426. More specifically, the key authorizer 620 looks up the authorization status associated with the key authorization code in the log of authorized keys 426. The key authorizer 620 determines whether the vehicle 110 may execute a high performance vehicle feature based on the key authorization status.

In operation, the road type determiner 630, determines a road type for the roadway 102. More specifically, the road type determiner 630 determines the location of the vehicle 110 on the map 422 using location information from the GPS receiver 230. Further, the road type determiner 630 determines whether the roadway 102 that the vehicle 110 is on a high-capacity road (e.g., racetrack 510, divided freeway 520, arterial roads 530, etc.) or a low capacity road (e.g., street 540). The road type determiner 630 determines whether execution of a high-performance vehicle feature is advisable based on the road type. In other words, the road type determiner 630 determines whether the roadway 102 is suitable for high-performance vehicle functions.

In operation, the object determiner 640, determines whether objects (e.g., people, animals, other vehicles) are in front of the vehicle 110 on the roadway 102. More specifically, the object determiner 640 searches for objects in the road clearance data (e.g., camera and/or radar data). Further the object determiner 640 monitors communications between the vehicle 110 and other vehicles (e.g., the second vehicle 120) to determine whether other vehicles will cross in front of the vehicle 110. The object determiner 640 determines whether execution of a high performance vehicle feature is advisable based on whether objects are in front of the vehicle 110. In other words, the object determiner 640 determines a road clearance status for the roadway 102.

In operation, the conditions determiner 650, determines the weather conditions at the location of the vehicle 110. More specifically, the conditions determiner 650 analyzes the weather information for indications of inclement weather (e.g., high humidity, rain, snow, high winds, etc.) not suitable for high-performance vehicle functions. The conditions determiner 650 determines whether execution of a high-performance vehicle feature is advisable based on whether the vehicle 110 is in a location with inclement weather. In other words, the conditions determiner 650 determines whether a weather conditions status at the location of the vehicle 110 on the roadway 102 is suitable for high-performance vehicle functions.

In operation, the road surface determiner 660, determines whether road hazards (e.g., the oil slick 162, the particulate debris 164, the pothole 166, the puddle 168, etc.) are in front of the vehicle 110 on the roadway 102. More specifically, the road surface determiner 660 searches for road hazards in the road condition information (e.g., camera and/or radar data). The road surface determiner 660 determines whether execution of a high performance vehicle feature is advisable based on whether road hazards are in front of the vehicle 110 on the roadway 102. In other words, the road surface determiner 660 determines a road hazard status for the roadway 102.

In operation, the tire status determiner 670, determines whether the tires of the vehicle 110 are in good condition. More specifically, the tire status determiner 670 compares the tire sample 429 to the tire reference 425. Further, tire status determiner 670 determines whether the comparison between the tire sample 429 and the tire reference 425 exceeds the tire threshold provided by the threshold data 427. The tire status determiner 670 determines whether execution of a high performance vehicle feature is advisable based on whether the tire sample 429 indicates that the tires are in good condition. In other words, the tire status determiner 670 determines a tire status for the tires of the vehicle 110.

In operation, the feedback generator 680 generates feedback for a driver of the vehicle 110. More specifically, the feedback generator 680 generates the visual and audio messages 312, 322 in response to determinations from the road type determiner 630, the object determiner 640, the conditions determiner 650, the road surface determiner 660, and/or the tire status determiner 670 that execution of a high-performance vehicle feature is not advisable. Rephrased, the feedback generator 680 generates the visual and audio messages 312, 322 based on one or more of an inappropriate road type determination provided by the road type determiner 630, a blocked road determination provided by the object determiner 640, an inclement weather determination provided by the conditions determiner 650, a poor road surface determination provided by the road surface determiner 660, and/or a poor tire status provided by the tire status determiner 670. In other words, the feedback generator 680 generates visual and audio messages 312, 322 to warn drivers that execution of a selected high-performance vehicle feature is not recommended.

Further, in operation, the feedback generator 680 generates pause, release, and stop commands for use in the BCM 250 to respectively, pause execution of a high-performance vehicle feature, release execution of a high-performance vehicle feature from a pause command, and stop (e.g., cancel) execution of a high-performance vehicle feature.

More specifically, the feedback generator 680 generates pause commands in response to the inappropriate road type determination, the blocked road determination, the inclement weather determination, the poor road surface determination, and/or the poor tire status. The feedback generator 680 generates release commands in response to selection of the override button 316 by a driver of the vehicle 110 received via the data receiver 610. The feedback generator 680 generates stop commands in response to an unauthorized key determination from the key authorizer 620 and selection of the exit button 314 by a driver of the vehicle 110 received via the data receiver 610.

Figure 7:
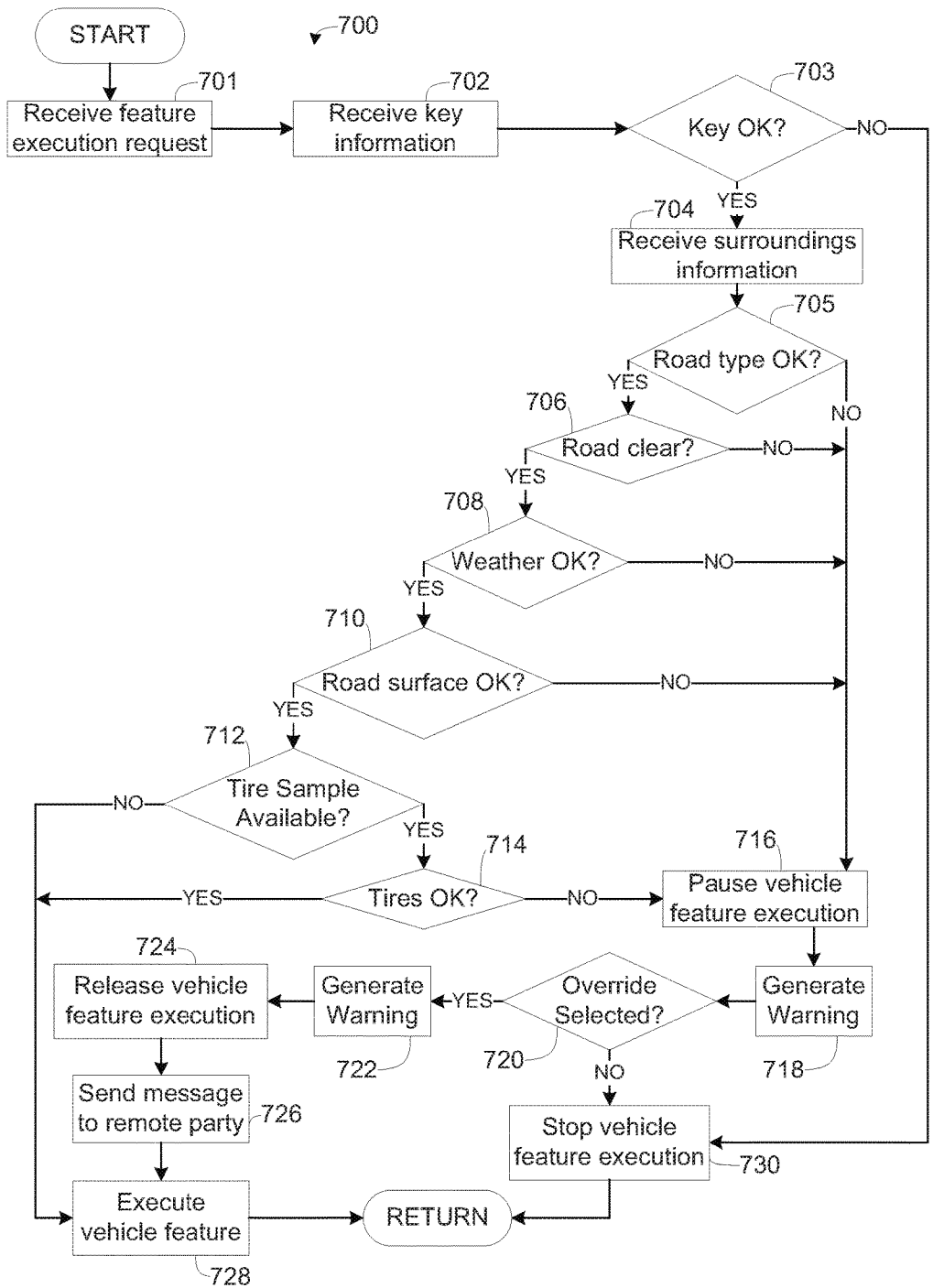
FIG. 7 is a flowchart of a method to analyze the surroundings of the vehicle of FIG. 1, which may be implemented by the electronic components of FIG. 4.

FIG. 7 is a flowchart of a method 700 to analyze the surroundings of the vehicle 110 of FIG. 1, which may be implemented by the electronic components 400 of FIG. 4. The flowchart of FIG. 7 is representative of machine readable instructions stored in memory (such as the memory 420 of FIG. 4) that comprise one or more programs that, when executed by a processor (such as the processor 410 of FIG. 4), cause the vehicle 110 to implement the example surroundings analyzer 430 of FIGS. 4 and 6. Further, although the example program(s) is/are described with reference to the flowchart illustrated in FIG. 7, many other methods of implementing the example surroundings analyzer 430 may alternatively be used. For example, the order of execution of the blocks may be changed, and/or some of the blocks described may be changed, eliminated, or combined.

Initially, at block 701, the data receiver 610 receives a high-performance vehicle feature execution request submitted by a driver of the vehicle via the IHU 260. As discussed above, the data receiver 610 is in communication with the IHU 260 via the first vehicle data bus 402 and/or the second vehicle data bus 404.

At block 702, the data receiver 610 receives key information including a key authorization code from the key 270. As discussed above, the data receiver 610 is in communication with the key 270 via the first vehicle data bus 402 and/or the second vehicle data bus 404. In some examples, the data receiver 610 is in wireless communication with the key 270.

At block 703, the key authorizer 620 compares the key authorization code to the log of authorized keys 426 to determine whether the key 270 is authorized to engage the selected high-performance vehicle feature. As discussed above, log of authorized keys 426 is stored in the memory 420 and is accessed by the key authorizer 620.

If, at block 703, the key authorizer 620 determines that the key 270 is not authorized, the method 700 proceeds to block 730. In other words, if the key authorizer 620 finds that the key authorization code provide by the key 270 does not substantially match one of authorized keys in the log of authorized keys 426, the key 270 is not authorized.

If, at block 703, the key authorizer 620 determines that the key 270 is authorized, the method 700 proceeds to block 704. In other words, if the key authorizer 620 finds that the key authorization code provide by the key 270 substantially matches one of authorized keys in the log of authorized keys 426, the key 270 is authorized.

At block 704, the road type determiner 630 analyzes location data from the GPS receiver 230 to determine whether the vehicle 110 is located on a high-capacity road suitable for high-performance vehicle features (e.g., the racetrack 510, the divided freeway 520, the main arterial roads 530, etc.). As discussed above, the road type determiner 630 accesses the map 422 and compares the location of the vehicle 110 provided by the GPS receiver 230 to the roadway locations and types (e.g., high or low capacity) on the map 422.

If, at block 704, the road type determiner 630 determines that the vehicle 110 is not on a high-capacity road, the method 700 proceeds to block 716.

If, at block 704, the road type determiner 630 determines that the vehicle 110 is on a high-capacity road, the method 700 proceeds to block 706.

At block 706, the object determiner 640 analyzes clearance information from the sensors 220 and the DSRC transceiver 240 to determine whether the road in front of the vehicle 110 is clear of objects (e.g., other vehicles, people, animals, etc.). As discussed above, the object determiner searches for objects in road clearance data provided by the sensors 220 via the data receiver 610 and monitors communications between the vehicle 110 and other vehicles via the DSRC transceiver 240.

If, at block 706, the object determiner 640 determines that the road in front of the vehicle 110 is not clear (e.g., blocked by another vehicle, person, animal, etc.), the method 700 proceeds to block 716.

If, at block 706, the object determiner 640 determines that the road in front of the vehicle 110 is clear, the method 700 proceeds to block 708.

At block 708, the conditions determiner 650 determines whether the vehicle 110 is surrounded by weather suitable for high-performance vehicle functions. As discussed above, the conditions determiner 650 monitors weather information provided by the central facility 150 via the network 130 and/or the DSRC transceiver 240.

If, at block 708, the conditions determiner 650 determines that the vehicle 110 is surrounded by inclement weather not suitable for high-performance vehicle functions (e.g., precipitation, fog, temperature at or below freezing, etc.), the method 700 proceeds to block 716.

If, at block 708, the conditions determiner 650 determines that the vehicle 110 is surrounded by weather suitable for high-performance vehicle functions (e.g., clear, low humidity, temperature above freezing, etc.), the method 700 proceeds to block 710.

At block 710, the road surface determiner 660 analyzes road condition information provided by the sensors 220 via the data receiver 610 to determine whether the road in front of the vehicle 110 is free of road hazards 160. As discussed above, the road surface determiner 660 searches for road hazards detected by the sensors 220 (e.g., the oil slick 162, the particulate debris 164, the pothole 166, the puddle 168, etc.) in the road condition information.

If, at block 710, the road surface determiner 660 determines that the road in front of the vehicle 110 is not free of road hazards 160, the method 700 proceeds to block 716.

If, at block 710, the road surface determiner 660 determines that the road in front of the vehicle 110 is free of road hazards 160, the method 700 proceeds to block 712.

At block 712, the tire status determiner 670 determines whether the a tire sample 429 is present in the memory 420. As discussed above, the tire status determiner 670 accesses the memory 420 to search for the tire sample 429.

If, at block 712, the tire status determiner 670 determines that a tire sample 429 is not present in the memory 420, the method 700 proceeds to block 728.

If, at block 712, the tire status determiner 670 determines that a tire sample 429 is present in the memory 420, the method 700 proceeds to block 714.

At block 714, the tire status determiner 670 compares the tire sample 429 to the tire reference 425 to determine a difference between the tire sample 429 and the tire reference 425. Further, at block 714, the tire status determiner 670 determines whether the difference between the tire sample 429 and the tire reference 425 is below a threshold included in the threshold data 427. As discussed above, the tire status determiner 670 accesses the tire reference 425 and the threshold data 427 stored in the memory 420 to determine the difference to compare the determined difference to the threshold.

If, at block 714, the tire status determiner 670 determines that the difference between the tire sample 429 and the tire reference 425 is not below (e.g., exceeds) the threshold, the method 700 proceeds to block 716.

If, at block 714, the tire status determiner 670 determines that the difference between the tire sample 429 and the tire reference 425 is below the threshold, the method 700 proceeds to block 728.

At block 716, the feedback generator 680 generates a pause command to pause execution of the selected high-performance vehicle feature. As discussed above, the feedback generator 680 generates the pause command based on one or more of an inappropriate road type determination provided by the road type determiner 630, an blocked road determination provided by the object determiner 640, an inclement weather determination provided by the conditions determiner 650, a poor road surface determination provided by the road surface determiner 660, and a poor tire status provided by the tire status determiner 670.

At block 718, the feedback generator 680 generates visual and audio messages 312, 322 for display and announcement via the IHU 260 to warn the driver of the vehicle 110 that execution of the selected high-performance vehicle feature is not recommended. As discussed above, the feedback generator 680 generates the visual and audio messages 312, 322 in response to an inappropriate road type determination, a blocked road determination, an inclement weather determination, a poor road surface determination, and/or a poor tire status.

At block 720, the data receiver 610 determines whether driver of the vehicle 110 selected to override the warnings of the visual and audio messages 312, 322 via the override button 316.

If, at block 720, the data receiver 610 determines the that driver of the vehicle 110 selected to override the warnings of the visual and audio messages 312, 322, the method 700 proceeds to block 722.

If, at block 720, the data receiver 610 determines the that driver of the vehicle 110 did not select to override the warnings of the visual and audio messages 312, 322, the method 700 proceeds to block 730. As discussed above, a driver of the vehicle 110 may heed the visual and audio messages 312, 322 via selection of the exit button 314.

At block 722, the feedback generator 680 generates a follow-up visual and/or audio warning messages for display and announcement via the IHU 260. Thus, a driver of the vehicle 110 receives multiple warnings that execution of the high-performance vehicle feature is not recommended.

At block 724, the feedback generator 680 generates a release command to release (e.g., unpause) execution of the high-performance vehicle feature. As discussed above, the feedback generator 680 generates the release command in response to selection of the override button 316 by a driver of the vehicle 110.

At block 726, the feedback generator 680 generates and sends a notification message to the mobile device 170 via the DSRC transceiver 240 to inform a third party that the warnings of the visual and audio messages 312, 322 have been overridden. As discussed above, the feedback generator 680 generates the notification messages in response to selection of the override button 316 by a driver of the vehicle 110.

At block 728, the vehicle 110 executes the high-performance vehicle feature. The method 700 then returns to block 701.

At block 730, the feedback generator 680 generates a stop command to stop (e.g., cease, end, shut down, etc.) execution of the high-performance vehicle feature. As discussed above, the feedback generator 680 generates the stop command in response to an unauthorized key determination provided by the key authorizer 620 and/or to selection of the exit button 314 by a driver of the vehicle 110. The method 700 then returns to block 701.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may remind drivers to execute high-performance vehicle features under suitable conditions and in appropriate settings. Further, analyzing recorded tire samples may aid drivers in promptly replacing worn tires. Additionally, sending notifications to remote mobile devices may aid vehicle owners in monitoring how their vehicles are driven by another party (e.g., a child, a race driver, etc.). It should also be appreciated that the disclosed apparatus and methods provide a specific solution—determining a vehicle's surroundings, pausing execution of a vehicle feature based on the surrounding, and presenting an warning with an override feature—to a specific problem—execution of high-performance vehicle features under unsuitable road and/or weather conditions and/or in an inappropriate setting. Further, the disclosed apparatus and methods provide an improvement to computer-related technology by increasing functionality of a processor to determine a road type, determine road clearance, determine road conditions, determine weather conditions, determine tire condition, and to generate warnings including an override feature.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a global positioning system (GPS) receiver to generate location information;
sensors to generate road information; and
a display;
a processor and memory in communication with the sensors and the GPS receiver and configured to:
determine a road type using the location information;
determine a road clearance status using the road information;
present, via the display, a warning message that includes an override button based on one or more of the road type and the road clearance status; and
send a notification message to a remote mobile device when the override button is selected by a driver.

2. The vehicle of claim 1, wherein:
the processor is further configured to determine a road hazard status using the road information; and
the warning message is further based on the road hazard status.

3. The vehicle of claim 1, further comprising a dedicated short range communication (DSRC) transceiver to provide weather information and wherein:
   the processor is further configured to determine a weather status using the weather information; and
   the warning message is further based on the weather status.

4. The vehicle of claim 1, wherein:
   the sensors are to generate tire information;
   the processor is further configured to determine a tire status using the tire information; and
   the warning message is further based on the tire status.

5. The vehicle of claim 1, wherein the processor is further configured to pause execution of a selected vehicle feature based on at least one of the road type or the road clearance status.

6. The vehicle of claim 5, wherein the processor is further configured to release execution of the selected vehicle feature if the override button is selected by the driver.

7. The vehicle of claim 1, wherein the processor is further configured to:
   determine authorization of a key;
   start the vehicle in response to determining that the key is authorized to start the vehicle; and
   stop execution of a selected high-performance vehicle feature in response to determining that the key authorized to start the vehicle is unauthorized to start the selected high-performance vehicle feature.

8. A method comprising:
   determining, with a processor, a road type using location information provided by a global positioning system (GPS) receiver;
   determining, with the processor a road clearance status using road information generated by sensors;
   generating, with the processor, a warning message based on at least one of the road type or the road clearance status, the warning message including an override button; and
   sending, with the processor, a notification message to a remote mobile device if the override button is selected by a driver.

9. The method of claim 8, further comprising determining, with the processor, a road hazard status using the road information, wherein the warning message is further based on the road hazard status.

10. The method of claim 8, further comprising determining, with the processor, a weather status using weather information generated by a dedicated short range communication (DSRC) transceiver, wherein the warning message is further based on the weather status.

11. The method of claim 8, further comprising determining, with the processor, a tire status using tire information generated by the sensors, wherein the warning message is further based on the tire status.

12. The method of claim 8, further comprising pausing, with the processor, execution of a selected vehicle feature based on at least one of the road type or the road clearance status.

13. The method of claim 12, further comprising releasing, with the processor, execution of the selected vehicle feature if the override button is selected by the driver.

14. The method of claim 8, further comprising:
   determining, with the processor, authorization of a key;
   starting the vehicle in response to determining that the key is authorized to start the vehicle; and
   when the vehicle is started, stopping execution of a selected high-performance vehicle feature in response to determining that the key authorized to start the vehicle is unauthorized to start the selected high-performance vehicle feature.

15. A system comprising:
   a central facility having a database of weather information;
   a dedicated short range communication (DSRC) transceiver disposed in a vehicle and in communication with the database;
   sensors disposed in the vehicle to generate road information;
   a global positioning system (GPS) receiver disposed in the vehicle to generate location information of the vehicle; and
   a processor in communication with the DSRC transceiver, the sensors, and the GPS receiver and configured to:
      determine a road type based on the location information;
      determine a road clearance status based on the road information;
      determine a weather status based on the weather information;
      pause execution of a selected vehicle feature based on one or more of the road type, the location information, and the weather information; and
      send a notification message to a mobile device in response to detecting selection of the override button.

16. The system of claim 15, wherein the processor is further configured to generate a warning message if execution of the selected vehicle feature is paused, the warning message including an override button and an exit button.

17. The system of claim 16, wherein the DSRC transceiver is in communication with the mobile device.

18. The system of claim 16, wherein the processor is configured to end execution of the selected vehicle feature if the exit button is selected.

19. The system of claim 15, further comprising memory in communication with the processor to store a tire reference and a tire threshold and wherein:
   the sensors further generate tire information; and
   the processor is further configured to:
      determine a difference between the tire information and the tire reference;
      determine a tire status based on the difference and the tire threshold; and
      pause execution of the selected vehicle feature based on the tire status.

20. The system of claim 15, wherein the processor is further configured to:
   determine authorization of a key;
   start the vehicle in response to determining that the key is authorized to start the vehicle; and
   stop execution of a selected high-performance vehicle feature in response to determining that the key authorized to start the vehicle is unauthorized to start the selected high-performance vehicle feature.

* * * * *